United States Patent Office 3,841,941
Patented Oct. 15, 1974

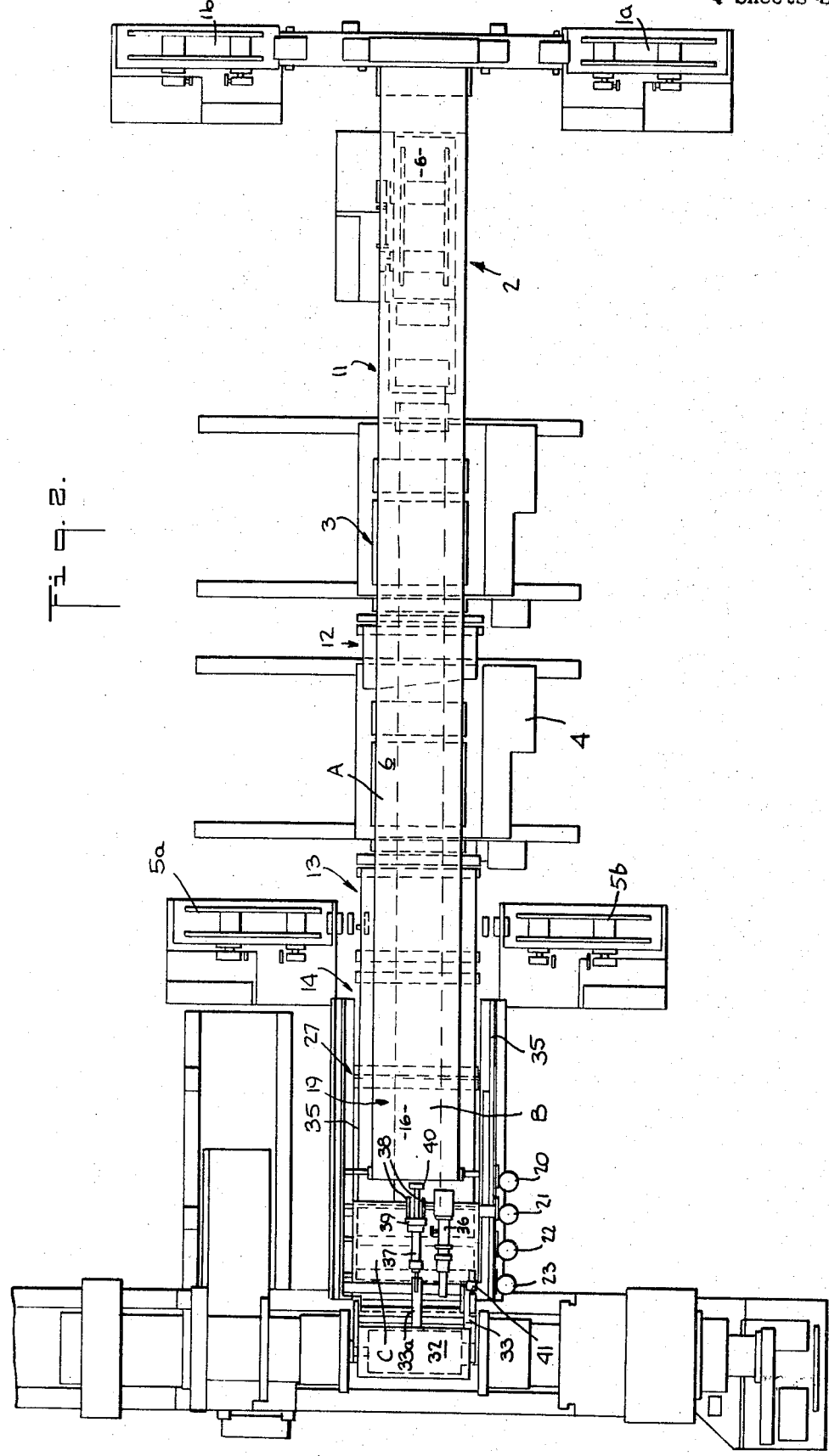

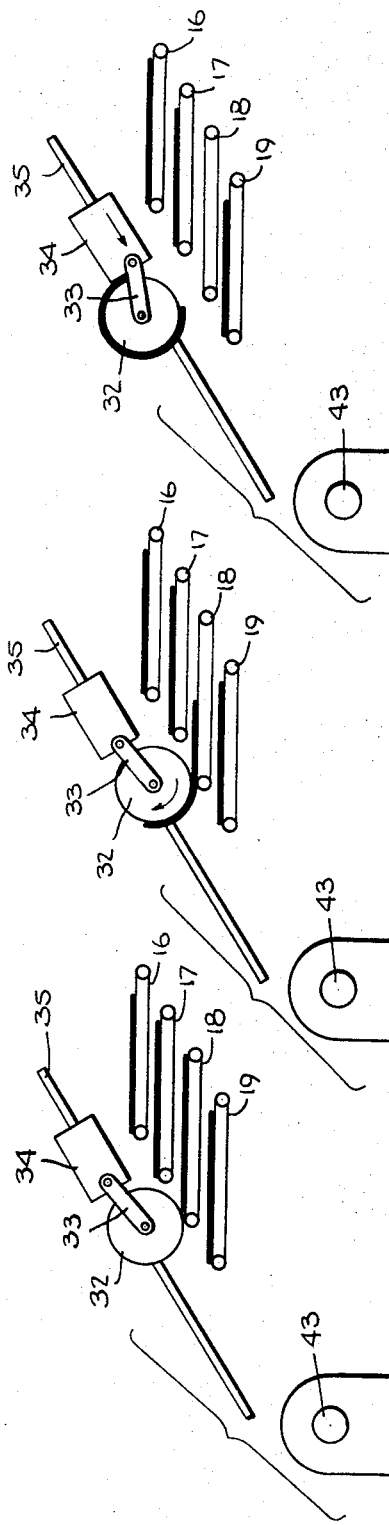
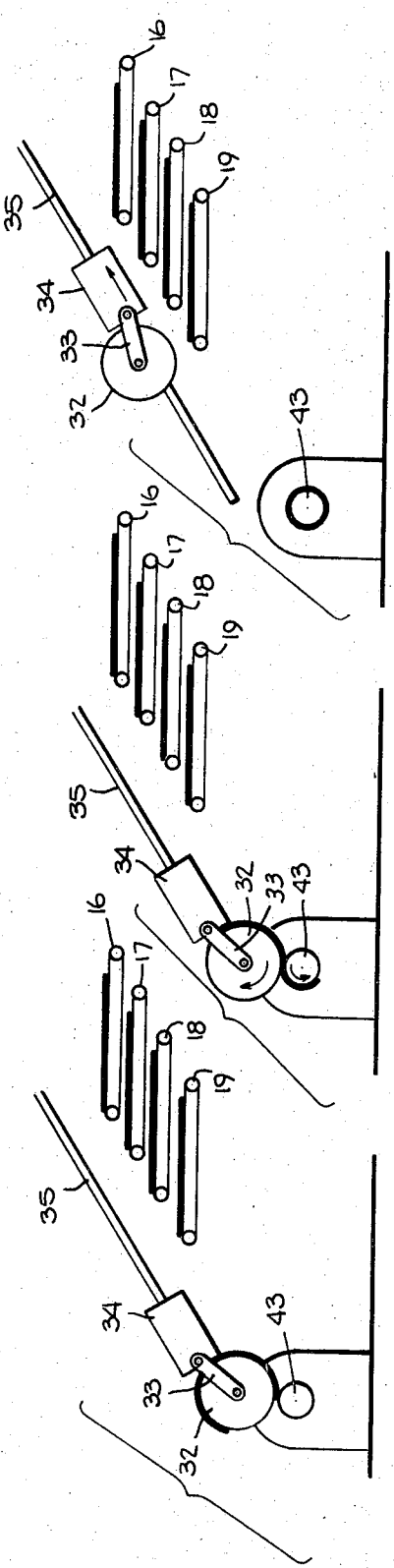

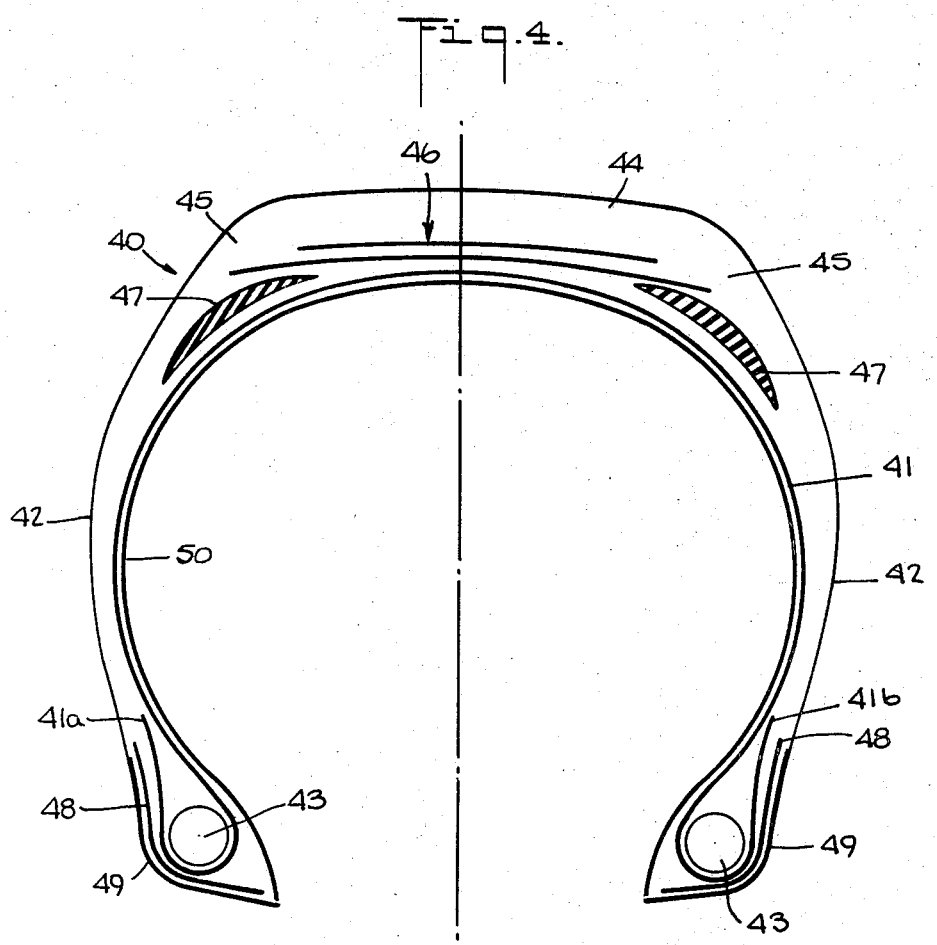

3,841,941
APPARATUS FOR SERVICING A TIRE
BUILDING MACHINE
Jean Leblond and Guy Danneels, Compiegne, and Maurice
Lambert, Machemont, France, assignors to Uniroyal,
Neuilly-sur-Seine, France
Filed Sept. 1, 1972, Ser. No. 285,954
Claims priority, application France, Sept. 9, 1971,
7132573
Int. Cl. B29h 17/02, 17/14
U.S. Cl. 156—406
9 Claims

ABSTRACT OF THE DISCLOSURE

This invention is an apparatus for supplying, centering, cutting, transferring and applying tire building elements in the required order and at the required time to a tire carcass building drum. A plurality of supply stations, provide the tire building elements to a respective plurality of parallel superimposed motor-driven first conveyors. Juxtaposed adjacent the end of each first conveyor is a like plurality a parallel superimposed motor-driven second conveyors. An intermediate drum successively tangentially contacts a selected one of the second conveyors and receives the tire building element. The intermediate drum thereafter successively transfers the element to the tire building drum. The second conveyor can be driven directly or together with the first conveyor.

---

This invention is directed to a pneumatic tire building apparatus, and in particular to an apparatus for supplying to a pneumatic tire carcass building drum various tire building elements. Such an apparatus is generally referred to as a servicer.

As is generally known a pneumatic tire comprises a plurality of building elements assembled in a desired order. The building elements comprise generally at least one rubber coated ply layer forming a carcass. The ply may be a natural or synthetic textile, such as cotton, rayon, nylon or polyester, or may be a non-textile, such as glass or metal, particularly, steel. The ply material may be in the form of cords, cables, wires, filaments, strands or the like, and comprises a single or multiplicity of such materials, twisted or untwisted. A pneumatic tire further generally includes a rubber coated bundle of twisted wire which forms a bead wire ring. The tire may further include a breaker or belt disposed between a tread and the carcass, the breaker being formed of materials similar to the carcass ply materials. In addition the tire may include sidewalls; chafer and toe strips arranged about the bead wire ring as a reinforcement. In pneumatic tires intended for heavy service additional tire building elements may be included, as compared to tires intended for use on passenger automobiles. Such additional building elements may include sidewall stiffeners; cushion layers between the edges of the breaker layers and between the breaker and the tread and the breaker and the carcass; apex and filler strips disposed in the region of the bead wire ring; shoulder strips; carcass liners and such other elements as may be considered necessary for the intended service of the pneumatic tire.

The present invention is intended for use as a servicer for any pneumatic tire building apparatus, whether such apparatus is manually or automatically controlled, in whole or in part. The invention can be used with a two-stage or a single-stage tire building machine. One particular apparatus suitable for use with this invention is described in copending U.S. Patent Application Ser. No. 269,341, filed July 6, 1972. According to the apparatus and method described in the aforementioned copending application a radially and axially expandable and contractable tire building drum is used in a single-stage building of a pneumatic tire carcass, particularly tire carcasses for heavy service. The essential elements of the tire are applied and the manufacturing steps are accomplished without transferring or removing the tire carcass from the drum upon which it is built. The essential elements and steps, include applying the carcass layers, positioning of the bead wire rings, turning the marginal edges around the bead wire rings, rolling and stitching, shaping the carcass into the toroidal configuration, applying, rolling and stitching of a reinforcing belt and a tread and application and shaping of the sidewalls. Shaping of the carcass into the toroidal configuration is accomplished by pneumatic pressure being applied between the carcass and the building drum.

The aforementioned pneumatic tire building apparatus may be used in cooperation with the present invention and an apparatus for rolling and stitching the tire elements applied to the tire carcass. An apparatus for rolling and stitching is described in U.S. Patent Application Ser. No. 265,927; filed June 23, 1972. According to the apparatus described in the aforementioned copending application, there is described a substantially completely mechanical tire stitching apparatus comprising a stitching roller; a first mechanical cam-controlled guiding means for individually and positively guiding the roller along a predetermined path on a tire surface to be rolled and stitched at a predetermined depth of penetration of the roller into said tire surface; and a second mechanical cam-controlled guiding means for continuously orienting the roller at a substantially normal angle of incidence relative to the tire surface as the roller is guided thereover by the first mechanical guiding means.

The aforementioned pneumatic tire building apparatus and rolling and stitching apparatus may be used in cooperation with the present invention and an apparatus for applying and setting the bead wire rings as described in copending U.S. Patent Application Ser. No. 265,876, filed June 23, 1972. According to the aforementioned copending application, means are provided for gripping wire tire beads including electro magnets for magnetically attracting and holding the beads. In such an apparatus means are provided for moving said gripping means separately and simultaneously both perpendicular and parallel to the axis of rotation of the building drum to position the gripping means in the final location of the bead wire rings to dispose the beads within the grooves of the rotary tire-building drum on which the tire carcass is formed.

In addition to the aforementioned copending applications, the present application may be used in cooperation with the apparatus described in copending U.S. Patent Application Ser. No. 255,488, filed May 20, 1972. In the last mentioned copending application, an apparatus is described for the automatic supply, guiding, applying and cutting to the desired length of an unvulcanized rubber strip. The rubber strip is applied to a tire carcass to improve adhesion of the subsequently applied tread layer. The apparatus includes means for unrolling the strip from a supply spool and centering the strip onto a transfer drum; means for applying the strip onto the transfer drum and cutting the strip to the desired length; and means for axially moving the transfer drum to a position adjacent to the tire building drum where the rubber strip is applied to the building drum.

The servicer of the present invention is an apparatus for supplying, assembling transferring tire building elements in the required order and at the required time to a tire carcass building drum. The invention comprises, in its preferred embodiment, a plurality of supply stations containing for example continuous rolls of material for each of the desired tire building elements. The material is unwound in a continuous strip and respectively centered on a first conveying means. The first conveying means comprises a plurality of parallel superimposed motor-driven conveyors for each supply station and centering means. Located at the downstream end of each of the first conveying means is a cutting means to provide the desired tire building element. A second conveying means is located juxtaposed adjacent to the downstream end of the first conveying means. The second conveying means comprises a like plurality of parallel superimposed motor-driven conveyors. Each conveyor of the first conveying means directly feeds a corresponding conveyor of the second conveying means. Located between the first and second conveying means is a disengageable means which permits the motor to directly drive the second conveying means and to also drive the first conveying means. The second conveying means is therefore directly driven and may be operated together with or independent of the first conveying means.

A transfer means is located at the downstream end of the second conveying means. The transfer means includes an intermediate drum which can successively tangentially contact the downstream end of each of the second conveying means to receive the tire building element thereon. After receiving a tire building element, the intermediate drum successively tangentially contacts the tire building drum to apply thereon the tire building element. Instead of directly applying the tire building element to the building drum, the element can be applied to a further intermediate drum for subsequent transfer to the building drum.

According to a preferred embodiment of the invention, the intermediate drum can be raised or lowered to tangentially contact each of the parallel superimposed conveyors of the second conveying means.

According to a further embodiment, application of the tire building element from each of the second conveying means to the intermediate drum and from the intermediate drum to the building drum is accomplished by the natural adhesiveness of the element and the surface of each drum.

According to a further embodiment of the invention, the intermediate drum is successively rotatably driven by the second conveying means and the tire building drum during application of the building element.

According to still another embodiment of the invention, the intermediate drum is rotatably driven to a position wherein an edge or end of the building element is in tangential contact with the building drum.

The characteristics and advantages of the present invention will be more clearly understood from the following detailed description of several embodiments thereof when read in conjunction with the accompanying drawings, in which:

FIG. 2 represents a schematic top view of the servicer shown in FIG. 1;

Figure 1:
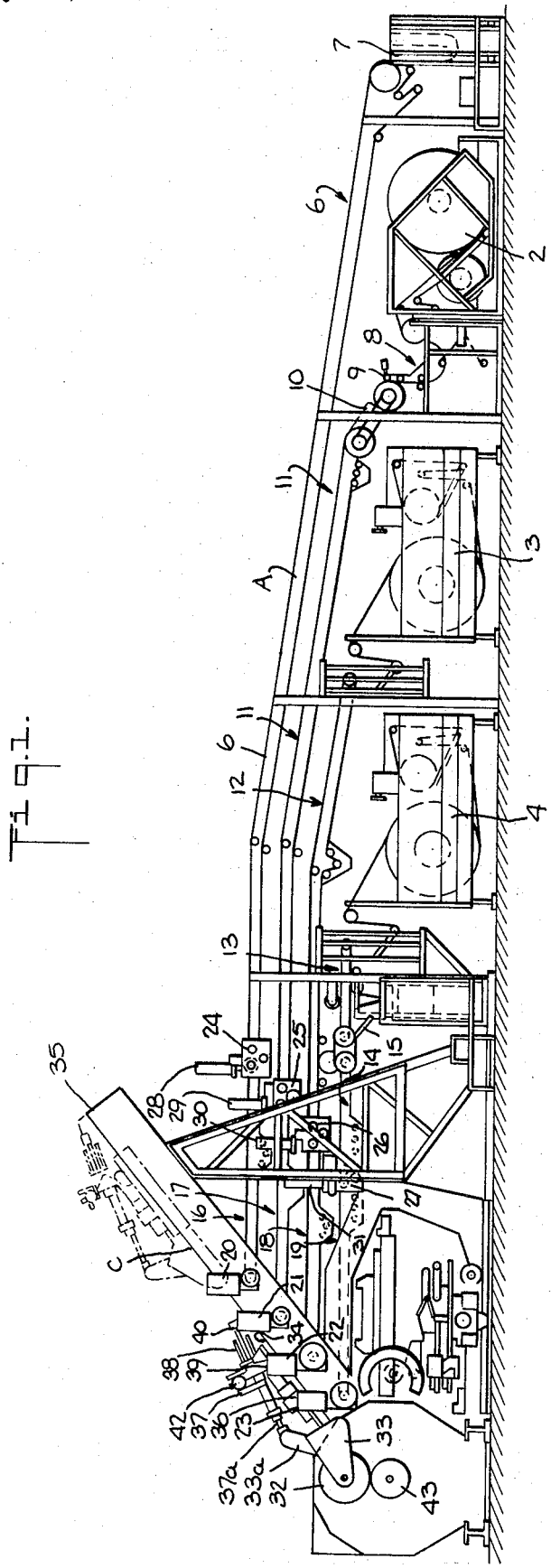
FIG. 1 represents an overall schematic side view of the tire building servicer according to the preferred embodiment of the invention.

FIG. 3 discloses a diagrammatic representation of the operation of the servicer illustrated in FIGS. 1 and 2, and shows the sequential phases of the operation of the servicer; and FIG. 4 is a transverse or radial cross-sectional through a typical pneumatic tire of the type considered by the present invention.

Referring to FIG. 4, a typical pneumatic tire 40 as considered by the present invention comprises a single-ply or multiple-ply carcass 41 and sidewalls 42. The sidewalls overlie the respective lateral regions of the carcass and terminate at their radially inwardmost edges in a pair of beads 43. In a pneumatic tire intended for heavy service the beads may be formed by a plurality of wire bundles which further may be twisted together. A tread 44 overlies the crown region of the carcass and adjoining the sidewalls 42 at their radially outwardmost regions, i.e, the shoulders 45 of the tire. A breaker 46 is interposed between the crown region of the carcass and the tread for reinforcing the latter. The marginal regions of the carcass ply or plies 41 are turned up about the beads 44, as shown at 41a and 41b.

It is to be understood that the tire 40 of FIG. 1 may be a radial ply tire or a non-radial, i.e., bias ply tire.

In addition to the above tire building elements, the tire may include cushions 47, disposed generally in the respective shoulder 45, and under the breaker 46. In order to give added strength to the bead region, the turned-up carcass at 41a and 41b, is reinforced by chafer strips 48 and strips of hard rubber 49. The strips 49 are preassembled to a carcass liner 50.

Referring to FIGS. 1 and 2, the upstream portion of the servicer includes a plurality of stations for unwinding rolled-up continuous strips from which the tire building elements are cut. The stations comprise supply and take-up spools and integral regulating devices for controlling the unwinding of the continuous strip. A supply station suitable for use in the present invention is described in U.S. Pat. No. 3,498,555. Thus, for example, the means for supplying the chafer strips 48 include two supply stations 1a and 1b which feed conveyor 6 of a first series A of conveyors. Functionally disposed between supply stations 1a and 1b is a centering means 7 for properly orienting strips 48 onto conveyor 6. A suitable centering means for use with the present invention is disclosed in U.S. Pat. No. 3,537,936.

The station for supplying and unwinding the breaker cushions 47 includes a spool 2 of the type described with respect to stations 1a and 1b. Wound on spool 2 is a pre-shaped strip which is fed into a centering means 8 similar to centering 7. The pre-shaped strip is thereafter cut by a rotary knife 9. The rotary knife 9 divides the strip in a direction corresponding to the longitudinal movement of the strip into two half-strips which form the cushions 47. The two half-strips are separated and recentered by centering means 10 located immediately upstream from conveyor 11. Conveyor 11 receives the half-strips from centering means 10.

The supply station for unwinding the carcass ply 41 includes a spool 3 similar to the stations 1a, 1b and 2. Downstream of spool 3 is conveyor 12 for receiving and transporting the carcass ply 41. The supply station for unwinding the strip which forms the liner 50 includes a spool 4 of the type disclosed with respect to spool 1a, 1b, 2 and 3. Downstream of spool 4 is a conveyor 13 for receiving the strip for liner 50. Conveyor 13 further feeds a conveyor 14. Two supply stations 5a, 5b, similar to the previous supply stations, provide the hard rubber strips 49 to conveyor 14. Centering means 15, similar to centering means 7, is functionally located between conveyor 14 and spools 5a and 5b.

Supply stations 1a, 1b and 5 are removable units whereas supply stations 3 and 4 are integral with the framework of the servicer and only the spools containing the tire building elements are removable.

Conveyor 13 and 14 further include means (not shown) for assembling the liner 50 with the reinforcing strips 49.

The four conveyors 6, 11, 12 and 13–14, comprise the first series A of conveyors. The first conveyor series A are linear, parallel and superimposed, the purpose of which is to supply, guide, center and preassemble the various tire building elements from the continuous strips, and transport these elements to a second series B of conveyors, to be described below.

A plurality of severing means 28, 29, 30 and 31 are functionally disposed at the downstream end of respective conveyors 6, 11, 12 and 13–14. The severing means is a known cutting means e.g., heated knife, adapted to the type of strip to be cut. Downstream from each conveyor 6, 11, 12 and 13–14 is a second series of corresponding conveyors 16, 17, 18 and 19. Conveyors 16, 17, 18 and 19 form a second series B of conveyors.

Conveyors 16, 17, 18 and 19 are respectively driven by motor-reduction gear units 20, 21, 22 and 23. Disposed between conveyors 6 and 16; 11 and 17; 12 and 18; and 19 and 13–14 is respective transmissions means 24, 25, 26 and 27. Transmission means 24, 25, 26 and 27 is connected to respective motor units 20, 21, 22 and 23 and provides a disengageable means for connecting the motor units for driving conveyors 6, 11, 12 and 13–14. Disengageable transmission means 16, 17, 18 and 19 of the second series B to be driven together with the conveyor 6, 11, 12 and 13–14 of the first series A. Transmission means 24, 25, 26 and 27, when disengaged, permits the direct driving of the conveyors of the second series B without the driving of the conveyors of the first series A.

The severing means 28, 29, 30 and 31, cut the respective tire building elements to the final desired length. The severing means cooperate with the centering means and with photoelectric devices, not shown, disposed on the conveyors, in order to determine the time of cutting for the final desired length of the tire building element.

FIGS. 1 and 2 further indicate a transfer means C located downstream from the second series B of conveyors. The transfer means C includes a carrier 34 and an inclined track 35 over which the carrier can slide. Extending from the carrier 34 is two arms 33 which rotatably supports an intermediate drum 32. The axis of drum 32 is oriented horizontally and is dipsosed between the arms 33. Arms 33 further are pivotably attached to carrier 34. Extending between the arms 33 is a link 33a which is connected to a rod 37a of a fluid operated jack 37. Jack 37 is rigidly attached to carrier 34. Actuation of jack 37 will cause rod 37a to move longitudinally and thereby move drum 32 radially. Drum 32 is therefore able to be raised and lowered and located in an intermediate radial position by jack 37. Rotationally mounted on carrier 34 is an adjustable stop means 39 for jack 37. The adjustable stop means comprises a cylinder 39 which is rotatable by a motor 42 and a plurality of abutment means 38 which are fixed relative to cylinder 39. Abutment means 38 can be positioned so as to select the desired length of stroke of rod 37a of jack 37. This selection is accomplished by the rotation of cylinder 39 by motor 42. Integral with one end of rod 37a is a limit means 40. When the abutment means 38 is located at a selected desired position, the stroke of rod 37a will be determined by the engagement of limit means 40 with the abutment means. Adjustable stop means 39 therefore provides a means for preselecting the maximum raising and lowering position of the arms 33 and consequently the intermediate drum 32.

Movement of carrier 34 along track 35 is provided by a variable speed motor and reduction gear unit 36 mounted on track 35 and thereby permits accurate positioning of the carrier. Accurate positioning of the carrier 34 on track 35 is also provided by a centering and locking means (not shown). Accurate positioning of the carrier 34 is essential to proper orientation of intermediate drum 32 for the transfer of the respective tire building elements from the second series B of conveyors to the building drum 43. Angular orientation of intermediate drum 32 is provided by motor and reduction gear unit 41 which rotates drum 32.

From the above description of transfer means C it is therefore seen that intermediate drum 32 can be raised or lowered as well as moved in a direction perpendicular to its axis and rotated to a desired angular position.

FIG. 3 schematically and diagrammatically describes the operative sequence of the servicer shown in FIGS. 1 and 2. Chafer strips 48 are unwound from supply stations 1a and 1b and centered by means 7 onto conveyor 6 which is driven by motor 20 through conveyor 16 and the engagement of transmission means 24. The chafer strips 48 are fed onto upper conveyor 16 of the second series B of conveyors. A photoelectric means (not shown) is activated by the presence of the chafer strip 48 on conveyor 16 and stops the conveyor so as to position the strip relative to the severing means 28. Actuation of the severing means 28 cuts the chafer strip to the desired length. Transmission means 24 is then disengaged and motor-reduction gear unit 20 is restarted, whereby only conveyor 16 is driven. Conveyor 16 is driven until the end of the cut-to-length chafer strips 48 would come into tangential or point of contact with the intermediate drum 32. This point of contact or tangential position is generally at the end of the conveyor 16.

For each other superimposed parallel conveyor series A and B, the same operational procedure described with respect to the chafer strips is repeated. The cushions 47 are unwound from supply station 2; centered by means 8; divided into two strips by rotary cutter 9 and recentered by means 10 onto conveyor 11. By operation of motor units 21, transmission means 25 and severing means 29, there is provided at the point of contact or tangential relationship with drum 32, a pair of cushions 47 on conveyor 17. Similarly, the carcass ply 41 is unwound from supply station 3, onto conveyor 12, cut to the desired length by severing means 30 and fed onto conveyor 18 by motor 22 cooperating with transmission means 26. As with the other tire building elements, the carcass ply 11 is positioned on conveyor 18 so as to be in point of contact or tangential relationship with drum 32. Supply station 4 provides the carcass liner 50 onto conveyor 13 which feeds conveyor 14. Supply stations 5a and 5b provide the reinforcing rubber strips 49 through centering means 15 onto conveyor 14. By means not shown, strips 49 are assembled to liner 50. The assembled liner-strips 49, 50 is cut to length by severing means 31. The coordinated operation of motor 23 and transmission means 27, feeds the assembled liner strips onto conveyor 19 to a position where it will be in point-of-contact or tangential relationship with drum 32.

According to a pre-established sequence, the drum 32 comes into tangential point of contact with a selected tire building element disposed on a conveyor and transfer the element to the tire building drum 43. FIG. 3 discloses this operation with reference to conveyor 18 on which is disposed the carcass ply 41. Carrier 34 is positioned so as to generally locate the drum 32 adjacent the end of conveyor 18, as shown in FIG. 3A. Jack 37 is actuated to move the drum 32 into tangential contact with the ply 41. The external surface of drum 32 is covered with natural unvulcanized rubber which provides a natural adhesiveness for adhering the various tire building elements. Thus ply 41 adheres to drum 32 as the conveyor 18 is set into motion. The movement of conveyor 18 in applying the carcass ply 41 rotates drum 32, as shown in FIG. 3B. After ply 41 is applied to the circumference of drum 32, jack 37 is actuated, raising drum 32, as shown in FIG. 3C. Carrier 34 is then moved on track 35 until it is juxtaposed adjacent to building drum 43. Simultaneous with the movement of carrier 34, drum 32 is rotated by motor unit 41 so as to angularly position the edge end of ply 41 into tangential contact with building drum 43. Actuation of jack 37 lowers drum 32 until the edge end of ply 41 is in tangential point of contact with drum 43, as represented in FIG. 3D. It should be noted that the stroke required to apply the ply 41 to drum 32, as shown in FIG. 3A, and the lowering of the drum 32 to transfer the ply 41 to drum 43, as shown in FIG. 3D, is determined and controlled by adjustable stop means 39.

After positioning drum 32 in tangential point of contact with drum 43, drum 43 is rotated by drive means not shown. The ply 41 is therefore transferred from drum 32 to drum 43 as shown in FIG. 3E. Where the tire building elements being transferred is the first such element, the natural adhesiveness of the contacting surfaces of the elements and drum 43, is sufficient to effect the transfer. Where a tire building element has already been applied to drum 43, a subsequent tire building element naturally adheres to the previously applied elements.

After the ply 41 is completely transferred to the circumferential surface of building drum 43, carrier 34 is moved along track 35 to position drum 32 in point of contact and tangential relationship to a further tire building element, as shown in FIG. 3F.

While the above sequence of operations, as shown in FIGS. 3A to 3F, describes the transfer of ply 41 from conveyor 18, it should be understood that the same sequence is applicable to the tire building elements on conveyors 16, 17 and 19.

The servicer for a tire building apparatus disclosed herein describes an embodiment of four superimposed parallel conveyors. It should be understood that any number of such conveyors can be used, depending on the number, type and shape of the tire building elements to be applied to the building drum. Furthermore, it is not necessary that the intermediate drum 32 directly transfer the tire building elements to building drum 43. For example, at least one auxiliary drum may be used onto which the intermediate drum 32 transfers the tire building element for subsequent application to the tire building drum 43. The use of an auxiliary drum may be necessary where the tire building drum is at a location remote from the intermediate drum.

It will be understood that the foregoing disclosure of preferred embodiments of the present invention is for purposes of illustration only, and that the various structural and operational features disclosed may be modified and changed in a number of ways none of which involves any departure from the spirit and scope of the invention as defined in the hereto appended claims.

What is claimed is:

1. An apparatus for servicing a pneumatic tire building drum with tire building elements comprising
    means for supplying a plurality of tire building elements;
    a first plurality of conveying means for receiving a respective one of said tire building elements;
    a second like plurality of conveying means juxtaposed adjacent the feed end of the first conveying means for receiving each respective building element from a respective one of the first conveying means;
    means for driving the first and second conveying means together;
    means for selectively independently driving the second conveying means; and
    a transfer means for receiving the tire building elements from the second conveying means, said transfer means including movable means for successively contacting each of the plurality of second conveying means to receive each of the respective tire building elements and successively contacting the building drum for application thereon of each of the respective tire building elements.

2. An apparatus according to claim 1 wherein the means for driving the conveying means comprising a direct drive for the second conveying means and the selective means comprises disengageable means for operatively connecting the direct drive with the first conveying means.

3. An apparatus according to claim 1 wherein the transfer means comprises
    an inclined track;
    a carrier slidably mounted on the track;
    said movable means comprising an intermediate drum supported on said carrier.

4. An apparatus according to claim 3, wherein the intermediate drum is covered with a material which naturally adheres to the tire building element.

5. An apparatus according to claim 3 comprising motor means mounted on the carrier for rotating the intermediate drum to a desired position.

6. An apparatus according to claim 3 comprising means for moving the intermediate drum along the inclined track.

7. An apparatus according to claim 3 including means for raising or lowering the intermediate drum to successive contact the second conveying means, said means comprising
    an arm connecting the intermediate drum to the carrier and
    jack means mounted on the carrier, said jack means having a rod connecting the arm to the jack means.

8. An apparatus according to claim 7 wherein the lowermost position of the intermediate drum is determined by adjustable stop means, said stop means comprising a rotatable cylinder mounted on the carrier;
    a plurality of stops disposed on the cylinder;
    motor means for rotating the cylinder and move the stops; and
    abutment means disposed on the jack rod for engaging the stops.

9. An apparatus according to claim 1 wherein the first and second conveying means each comprise a corresponding plurality of parallel superimposed motor-driven conveyors, each conveyor of the second conveying means being fed by a corresponding conveyor of the first conveying means.

References Cited

UNITED STATES PATENTS

| | | | |
|---|---|---|---|
| 2,918,105 | 12/1959 | Harris | 156—406 |
| 1,880,519 | 10/1932 | Stevens | 156—406 |
| 2,962,083 | 11/1960 | Hasselquist | 156—405 |
| 3,591,439 | 7/1971 | Leblond et al. | 156—406 |
| 1,713,927 | 5/1929 | Sheldon | 156—111 |
| 3,600,252 | 8/1971 | Henley et al. | 156—406 |
| 2,665,757 | 1/1954 | Stevens et al. | 156—405 |
| 3,547,732 | 12/1970 | Leblond | 156—405 |

CLIFTON B. COSBY, Primary Examiner

J. E. KITTLE, Assistant Examiner

U.S. Cl. X.R.
156—133, 405